United States Patent [19]

Bayhi

[11] 4,091,358

[45] May 23, 1978

[54] SEISMIC DETECTING MEANS FOR OBTAINING MAXIMUM SIGNAL ENHANCEMENT

[75] Inventor: Joseph F. Bayhi, Houston, Tex.

[73] Assignee: Exxon Production Research Company, Houston, Tex.

[21] Appl. No.: 495,947

[22] Filed: Aug. 9, 1974

Related U.S. Application Data

[63] Continuation-in-part of Ser. No. 350,872, Apr. 13, 1973, abandoned.

[51] Int. Cl.$^2$ ............... G01V 1/28; G01V 1/16; G01V 1/24
[52] U.S. Cl. ............... 340/7 R; 340/15.5 CP; 346/33 C
[58] Field of Search ........... 340/3 T, 7 R, 9, 15.5 CP, 340/15.5 MC, 15.5 TD; 346/33 C

[56] References Cited

U.S. PATENT DOCUMENTS

| | | | |
|---|---|---|---|
| 3,133,262 | 5/1964 | Strange | 340/7 R |
| 3,436,722 | 4/1969 | Strange | 340/7 R |
| 3,539,983 | 11/1970 | Burg | 340/15.5 TG |
| 3,613,071 | 10/1971 | Quay | 340/7 R |
| 3,775,738 | 11/1973 | Quay et al. | 340/7 R |
| 3,887,897 | 6/1975 | Neitzer et al. | 340/15.5 MC |

FOREIGN PATENT DOCUMENTS

| | | | |
|---|---|---|---|
| 724,808 | 12/1965 | Canada | 340/7 |

*Primary Examiner*—Nelson Moskowitz
*Attorney, Agent, or Firm*—E. Eugene Thigpen

[57] ABSTRACT

In seismic exploration of water-covered areas of the earth, a seismic cable containing seismic energy detecting means spaced along the cable is used. The detecting means are grouped into one or more arrays situated along the length of the cable, and each array is divided into a plurality of groups. The detector outputs within each group are connected in parallel within the cable. Selected group outputs, corresponding to varying segmental lengths along the cable, are summed to enhance seismic data signal-to-noise ratio. The summed signal used for seismic analysis is determined by the maximum array segmental length over which reflected seismic signal components are substantially phase correlated. This length varies with record time, with geologic dip of the earth layers, and with distance of the detectors from the seismic source. This invention permits the selection, during seismic analysis, of the array segmental length that provides the most useful seismic data. During seismic analysis, shorter segmental lengths are used during the portion of record time when high frequency reflections or nonvertical ray paths are present. Longer array segmental lengths are used during the record time when near vertical array paths exist or when only lower frequency reflections appear on the record.

16 Claims, 6 Drawing Figures

SEISMIC DETECTING MEANS FOR OBTAINING MAXIMUM SIGNAL ENHANCEMENT

CROSS-REFERENCE TO RELATED APPLICATIONS

This application is a continuation-in-part of co-pending application Ser. No. 350,872 filed Apr. 13, 1973, now abandoned.

BACKGROUND OF THE INVENTION

This invention relates to seismic exploration of water-covered areas of the earth where long seismic cables are used to detect seismic energy produced near the end of the cable.

In the past these long seismic cables normally have contained detectors grouped into a number of equal length arrays throughout the cable. In some special applications seismic cables having relatively short arrays of detectors have been used near the end of the cable at which the seismic energy source is located and longer arrays have been used farther from the source. The close-in seismic arrays of detectors were used to delineate shallow subsurface formations while the longer arrays were used to delineate moderate to deep reflecting horizons. However, this procedure discriminates against the higher frequency seismic energy which penetrates the earth to considerable depths that is useful for more exactly delineating subsurface earth formations. This procedure also discriminates against seismic energy arriving at the array at large angles off the vertical. With the advent of nondynamite seismic sources capable of generating appreciable seismic energy at higher frequencies, i.e., 50 to 1000 Hz, conventional seismic cables have been found to produce records which are so badly distorted as to be unusable in many instances.

SUMMARY OF THE INVENTION

In accordance with this invention, marine seismic exploration is conducted using an elongated cable having a multiplicity of seismic detector arrays more or less uniformly spaced in end-to-end relationship along the length thereof. The detectors within each array are divided into groups, and each group is comprised of a number of contiguously positioned seismic wave detectors normally connected in parallel. For seismic analysis, the signals from selected contiguous groups are summed (either before or after recording) to form composite signals, representing the summation of the seismic energy detected along selected segmental lengths of the array. The criteria for selecting the group summation to be used for seismic analysis are: high signal amplitude, low distortion, and low noise. Normally, the array segmental length over which the phase correlation of the reflected seismic signal having the maximum frequency of interest is within about one half cycle will provide the best signal characteristics. This length varies with a number of factors, but can be determined for a given array by the formula:

$$L = \frac{1.1\, bv}{2 \sin \phi}$$

where:

$L$ = array segmental length.

$b$ = the breath of the seismic wave (or the inverse of the frequency) of the maximum frequency of interest.

$v$ = the average velocity of the seismic wave.

$\phi$ = the average emergence angle of the seismic wave.

Average emergence angle can be determined from the formula:

$$\phi = \alpha + \frac{\arctan \frac{x}{d} \cos \alpha}{2 + \frac{x}{d} \sin \alpha}$$

where:

$x$ = the distance from the seismic source to the center of the array.

$d$ = the depth from which the seismic signal is reflected.

$\alpha$ = the dip angle of the reflecting horizon.

The emergence angle is the angle that the direction of seismic energy travel deviates from the vertical. The dip angle of a reflecting horizon is the angle that the reflecting horizon deviates from the horizontal. Any consistent units of measurement can be used, which typically may be feet and seconds.

High frequency seismic data provides greater resolution than low frequency data. A particular advantage of the invention is that it provides a method for recording and summing seismic data signals that enhances the data signal-to-noise ratio while minimizing distortion of high frequency seismic reflections. Another advantage is that it permits each detector array to be used for detecting shallow reflections and deep reflections. Still another advantage is that it permits the selection of the proper array segmental length for minimum distortion of reflections from dipping geologic layers at any recorded time. For example, a medium length array segment might be used at an early record time, then a shorter array segment for a later reflection from a dipping bed, and finally a longer array segment for a deeper reflection from a horizontal bed.

BRIEF DESCRIPTION OF THE DRAWINGS

In the drawings:

FIG. 1 (b) illustrates the angles of emergence of seismic waves reflected from dipping horizons;

DETAILED DESCRIPTION OF AN EMBODIMENT OF THE INVENTION

Figure 3:
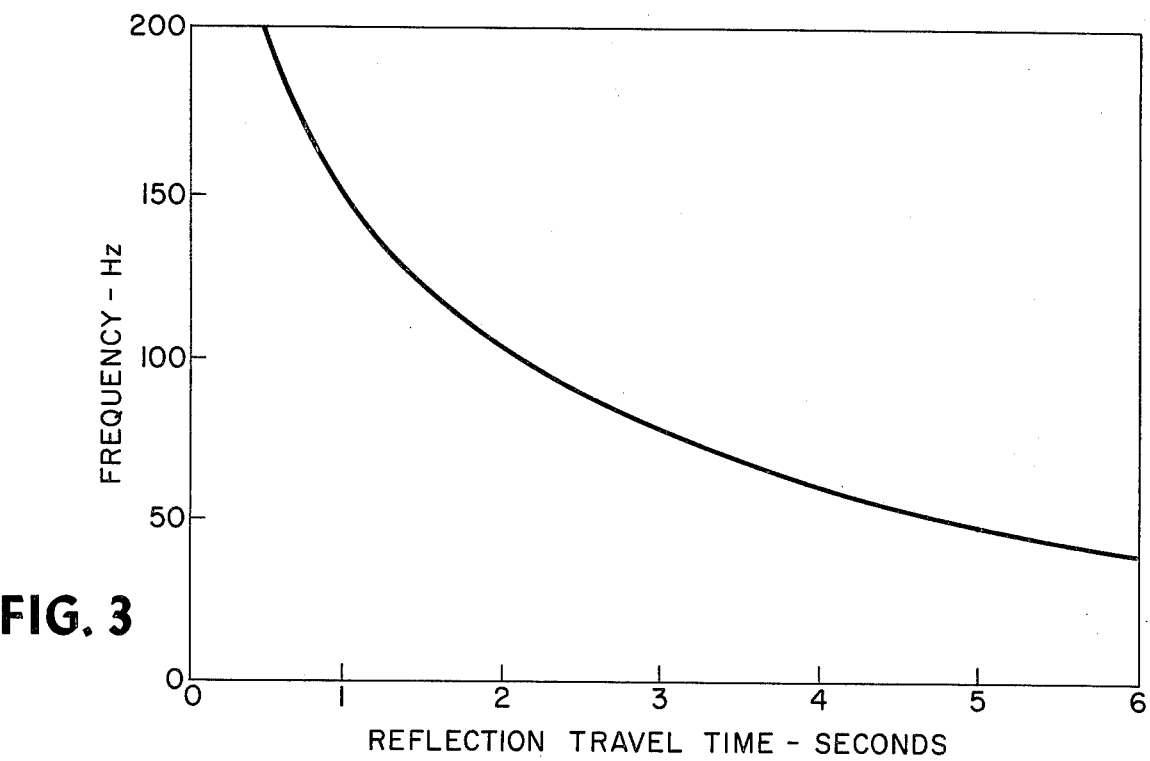
FIG. 3 is an illustration of typical frequency variation as a function of travel time for high frequency seismic systems.

It has been known for many years that the earth acts as a distributed filter for seismic waves; that is, seismic energy that is directed into the ground, reflected from a reflecting horizon, and detected at the earth's surface is increasingly attenuated with increasing depth of the reflecting horizon. The attenuation is greater for high frequencies than for low frequencies. Therefore, the seismic waves found at 3 seconds on a seismic record will have a much lower average frequency content than seismic wave reflections at one second. A typical plot of the maximum frequency having sufficient amplitude to be of interest as a function of record time is illustrated in FIG. 3. At one second on the record the frequency can be as high as 150 Hz whereas at four seconds on the record the frequency will seldom exceed 50 Hz.

In the past, seismic frequencies in the vicinity of 10 to 25 Hz have normally been used for most seismic explorations using the reflection technique. At such low frequencies, the length of the array over which seismic detector or hydrophone signals are summed is seldom critical. Although there will be some phase variation in the seismic signal components reflected from a given subsurface horizon when detected by different seismic detectors along an array, the seismic wavelength will be sufficiently long so that phase difference will not cause significant signal distortion when the outputs of the seismic detectors are summed. However, at high frequencies the combining of seismic signals detected by long arrays will result in considerable distortion of the seismic signal. This distortion will increase with increasing distances of the array from the seismic source because the difference in travel time from the seismic source to the reflecting horizon and back to the various seismic detectors along the array increases. As a result, in the past, high frequency seismic energy has been almost uniformly detected by very short arrays close to the source.

This invention provides a method for recording and analyzing seismic data that enhances signal-to-noise ratio and avoids excessive distortion of high frequency signals or signals from dipping beds due to signal phase difference. To enhance signal-to-noise ratio a multiplicity of hydrophone outputs are summed together. To avoid excessive distortion due to phase difference, the summed hydrophone signals must have substantial phase correlation. This invention permits all of the arrays to be used for detecting high frequency reflections. At the beginning of the seismic record time, when high frequency signals will be more predominant, shorter array segmental lengths are used for seismic analysis in order to avoid excessive signal distortion caused by signal phase differences. During later record times when only low frequency seismic reflections will be present, longer array segmental lengths are used for seismic analysis so as to provide more signal amplification and attenuation of multiple reflections and other unwanted signals. At any record time, shorter array segmental lengths are used if dipping beds produce increased emergence angles.

Figure 1A:
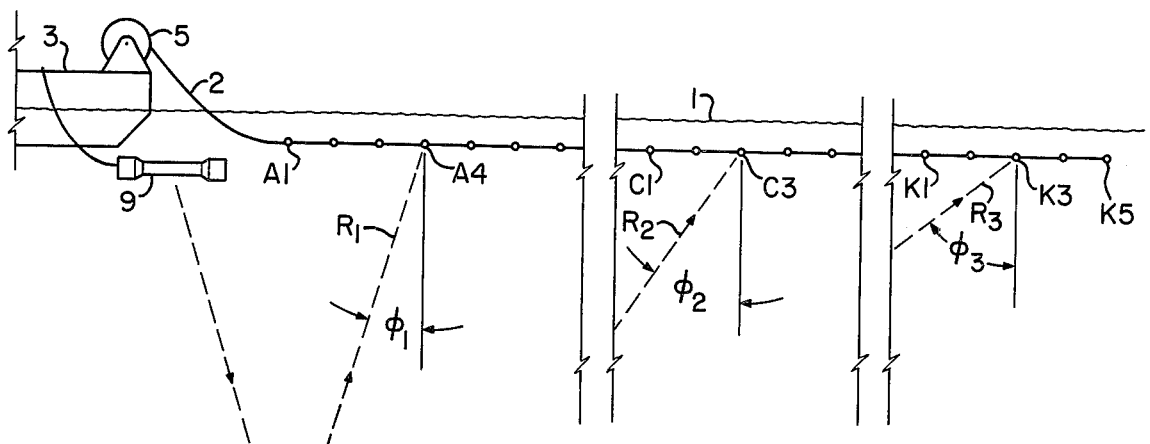
FIG. 1 (a) is a schematic diagram illustrating a seismic cable being towed by a vessel for the purpose of showing the angles of emergence of seismic waves reflected from a horizontal horizon at various distances from a seismic source.
Figure 1B:
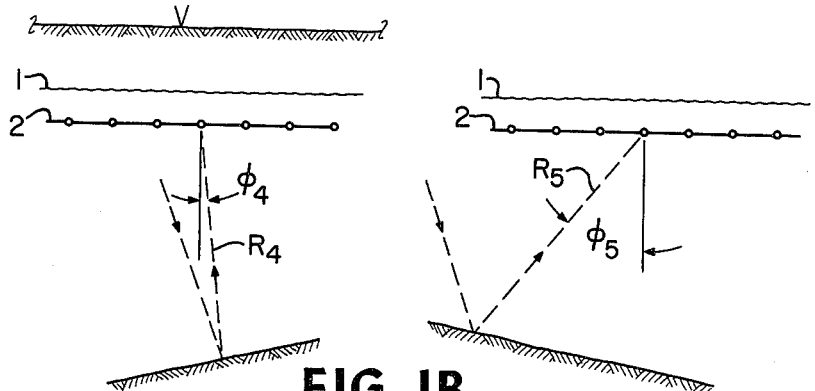

In FIG. 1 (a) there is illustrated a seismic detecting cable 2 such as used in connection with the present invention. The cable 2 is illustrated as being towed beneath the water's surface 1 by a vessel 3 carrying a reel 5 on which the cable may be wound and from which the cable is towed. A seismic source 9, preferably capable of generating seismic energy up to at least 250 Hz, also is illustrated as being towed by the vessel 3.

The seismic cable 2 is comprised of a multiplicity of detector arrays each subdivided into a multiplicity of groups of detectors. The hydrophones within each group are normally connected in parallel so as to enhance desired seismic signals and to cancel out noise signals that impinge thereon. Certain of the seismic detector groups are designated by reference numerals such as A1, A4, C1, C3, K1, K3, and K5. The letter designator corresponds to the detector array as will be discussed hereinafter.

In FIG. 1 (a) the seismic source 9 may be a source such as described in U.S. Pat. No. 3,480,101, preferably sized so as to generate seismic energy predominantly in the range of 20 to 1000 Hz. This may be accomplished by making the seismic source about 2 to 5 inches in diameter and 10 to 20 inches in length.

When the seismic source 9 is actuated, seismic energy will be propagated in all directions. Some will be diffracted, refracted, or reflected from interfaces of subsurface formations having different velocity characteristics. That which is reflected will progress upwardly through the earth after reflection and some of the energy will be detected by the individual detectors in the cable 2. The energy reflected from a horizontal reflecting horizon will be coming from a near vertical direction when detected by the detectors near the source 9, as indicated by the ray path $R_1$; therefore, the angle of emergence $\phi_1$ is very small. This means that all of the detectors in the array A will detect the seismic energy reflected from a given horizontal horizon at substantially the same time. The phase difference in the reflected energy when detected by the various hydrophones along the array will be slight so that the sum of the energy will tend to reinforce on the record. However, seismic energy reflected from the same horizon, following ray path $R_3$ and detected by the detectors in array K, at a distance from the source 9, will arrive at an oblique angle which may be as much as 45° or greater with respect to the vertical such that the angle of emergence $\phi_3$ is quite large. The energy reflections from the given subsurface horizon will be detected sequentially by the detectors in array K and if summed together will tend to cancel each other, at least partially, due to the lack of phase correlation. The energy following ray path $R_2$ detected by an intermediate detector will arrive at an angle of emergence $\phi_2$ intermediate between $\phi_1$ and $\phi_3$. As shown in FIG. 1 (b), the emergence angle $\phi$ depends on the dip angle of the subsurface horizon as well as the depth of the horizon and the distance of the detectors from the seismic source. The dip angle of the reflecting horizon can either increase or diminish the dip angle, depending on the direction of the dip.

Figure 4:
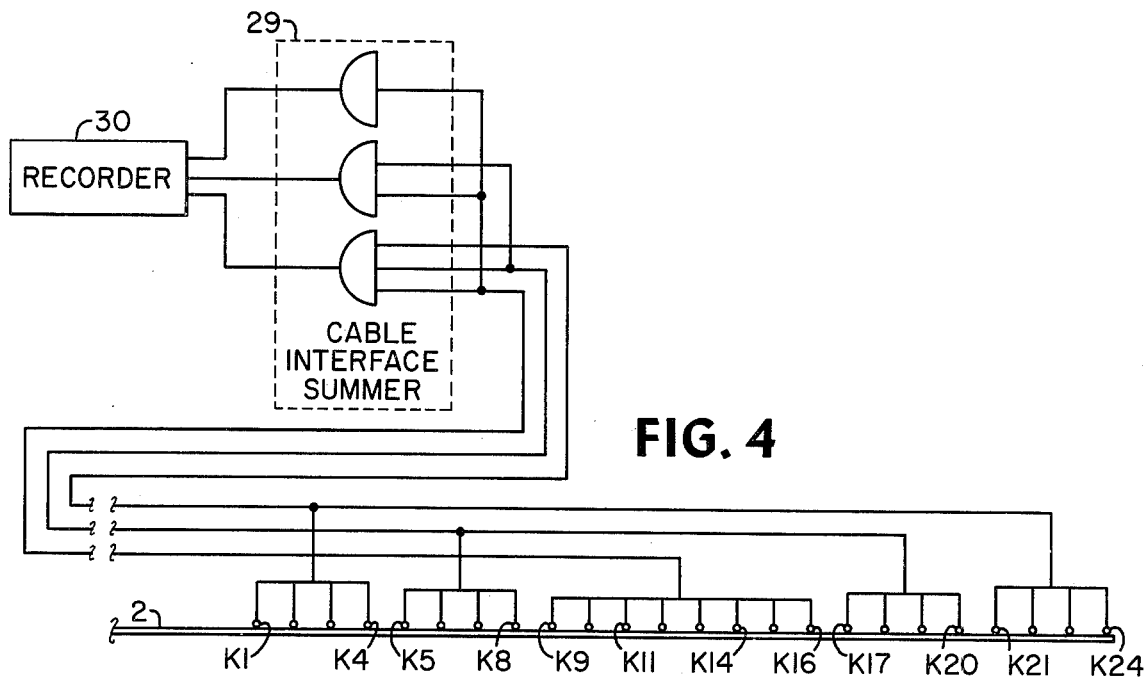
FIG. 4 is a schematic drawing of a portion of the cable of FIG. 1 (a)

Preferably, the detector group located at the center of each array is recorded separately. The two groups located to either side of the center group are connected together in parallel within the cable and, as illustrated in FIG. 4, summed with the center group and recorded on a second recording channel. On a third channel a summation of the two groups located to either side of the three central groups plus the three central groups are recorded, and so on. As an alternative, each group can be recorded separately, and the groups summed during the seismic analysis process.

This recording technique permits different segmental lengths of the arrays to be used for analyzing different vertical segments of the subsurface formation. The recorded signal from the longest array segment wherein the output signals from the detectors within the array segment will be substantially in phase with each other, is normally used for seismic analysis. The summation will result in a larger signal amplitude. The unwanted signal present in each of the detector outputs, on the other hand, will normally have a low phase correlation, so that the noise amplitude will be attenuated by summing the detector output signals. Normally, the composite signal from the array segmental length over which the detected seismic signal has a phase difference of one half cycle will provide the best signal characteristics, but the characteristics of the noise present in the seismic record may suggest the need for a somewhat shorter or longer length. The maximum array segmental length over which the phase correlation is within one half cycle can be determined from the formula, $$L = \frac{1.1bv}{2 \sin \phi}.$$

The value of $\phi$, at a given array, can be determined from the formula:

$$\phi = \alpha + \frac{\arctan \frac{x}{d} (\cos \alpha)}{2 + \frac{x}{d} \sin \alpha}$$

In the formula, the symbols have the definitions stated earlier.

It is apparent from the above formula that if the values of the other terms remain constant, increasingly shorter arrays must be used with increasing distance from the seismic source or with increasing values of the dip angle $\alpha$; and that increasingly longer arrays can be used with increasing depth of reflecting horizons.

Figure 2:
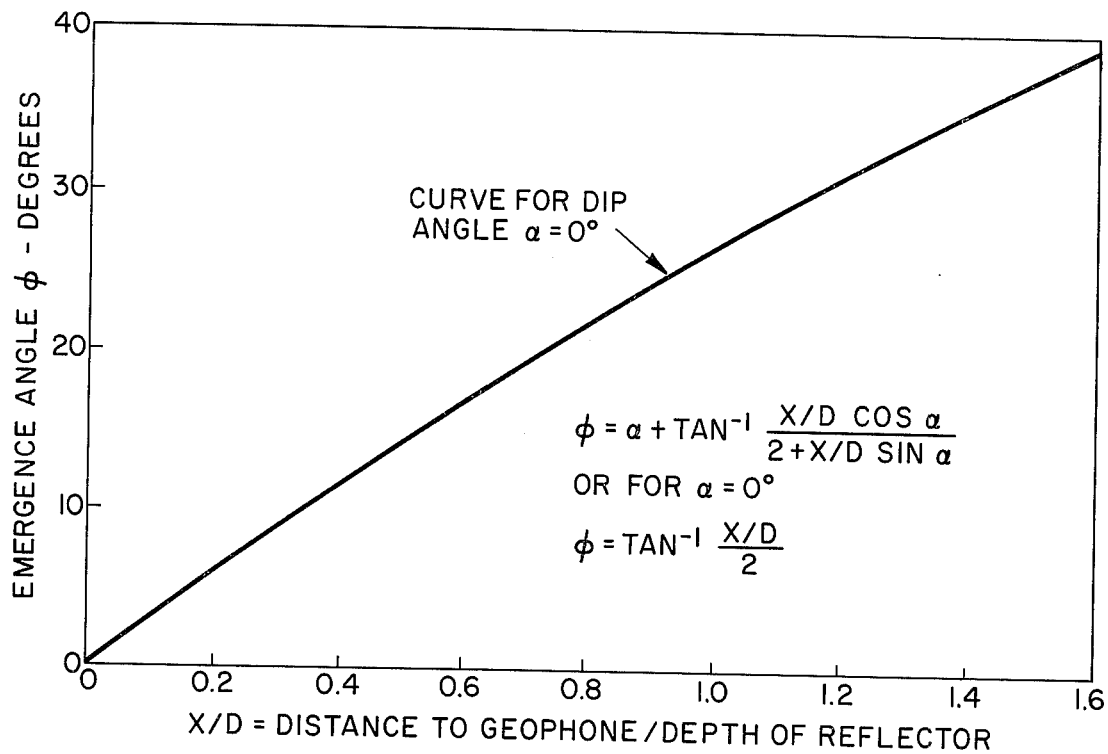
FIG. 2 is a coordinate presentation of emergence angle as a function of $x/d$ where "$x$" is the distance from the source to a hydrophone and "$d$" is the depth of a seismic reflector.

The dip angle, "$\alpha$," of reflecting horizons will generally not be known, initially, and assumed to be zero. The curve in FIG. 2 can be used to calculate the emergence angle for this condition. It may be determined from the initial data analysis that a reflecting horizon has a dip angle "$\alpha$" that further increases the emergence angle "$\alpha$." A recalculation must then be made using this dip angle and the depth of the reflecting horizon to determine curves for computing the emergence angle more accurately. After this recalculation it may be determined that a shorter array segment will better delineate the reflecting horizon.

Figure 5:
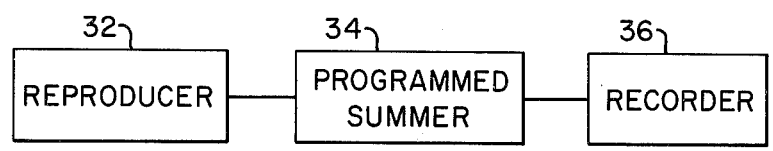
FIG. 5 is a schematic diagram of apparatus for processing seismic data in accordance with the invention.

The significance of the immediately foregoing discussion will become more evident upon consideration of FIGS. 4 and 5. In FIG. 4 an enlarged representation of array K of the cable is illustrated including detectors K1 through K24. The detectors in the central group K9–K16 are electrically connected in parallel within the cable as are the detectors in groups K1–K4, K5–K8, K17–K20, and K21–K24. Furthermore, groups K1–K4 and K21–K24 are electrically connected together in parallel within the cables as are groups K5–K8 and K17–K20. The output from the central group K9–K16 is recorded by recorder 30. In the cable interface summer 29, groups K9–K16, K5–K8, and K17–K20 are summed together; and groups K9–K16, K5–K8, K17–K20, K1–K4, and K21–K24 are summed together, so that recordings can be made simultaneously of three different array segmental lengths. The cable interface summer may be conventional analog summing circuits having the required electrical isolation between inputs from each group or group pair to be summed by a particular summing circuit.

Alternatively, group K9–K16, group pair K5–K8 and K17–K20, and group pair K1–K4 and K21–K24 may be recorded separately.

The records produced by recorder 30 are subsequently reproduced by a seismic reproducer 32, and if the groups or group pairs are recorded separately, they are summed by programmed summer 34, which may be a digital computer programmed to form the desired array segmental length. If the records are in analog form, the programmed summer may be a conventional analog summing circuit. The output of the summer is then applied to a suitable visual recorder 36. If no summing is necessary, the output of the seismic trace reproducer 32 is applied to the visual recorder.

Let it be assumed that it has been previously determined in the area from which the records were taken that the attenuation of the earth is such that the maximum frequencies that will be detected will vary as in FIG. 3. Let it also be assumed that the variation in the angle of emergence of seismic waves at the location of the array K is such that, for the first second of record time the maximum frequency of interest will be faithfully detected without undue distortion or attenuation by an array length not greater than 90 feet; that for the next second of record time the maximum length can be 180 feet and for the third second of record time the maximum length can be 270 feet. Further, assume that the central group K9–K16 occupies a cable length of 90 feet, and that each of the other groups occupies a cable length of 45 feet. Under these circumstances, the seismic record representing only the seismic signals detected by detectors K9–K16 will be used for seismic analysis during the first second of record time. During the next second of record time the data records or traces produced by detectors K5–K20 inclusive, will be used, and thereafter the traces or records produced by all of the detectors K1–K24 in the array will be used. In this manner maximum cancellation of unwanted noise signals will be effected without undue cancellation or distortion of desired high frequency seismic signals. It should be noted that the initial seismic analysis may detect subsurface horizons having dip angles different from those used for initially calculating the length of array segments to be employed for analyzing a given record time span and that shorter arrays may delineate such horizons more accurately.

I claim:

1. In a method for delineating subsurface formations for use in seismic exploration of water-covered locations of the earth wherein seismic energy is generated by a seismic source, a portion of the seismic energy is detected by seismic detectors spaced along an elongated cable and comprising at least one seismic array, and the output signals from said seismic detectors are recorded for later seismic analysis, the improvement comprising:

dividing said array into a plurality of detector groups having parallel connected outputs, said array comprised of a central detector group and a plurality of groups located to either side of said central group;

summing the output of selected numbers of detector groups located adjacent the central detector group with the central detector group output; and recording simultaneously the output signal from the central detector group and the summed seismic signal from said central detector group and said selected numbers of detector groups located adjacent the central detector group.

2. The method of claim 1 wherein the output of each detector group located to one side of said central detector group is connected in parallel with the output of the detector group similarly located to the other side of said central detector group.

3. In a method for delineating subsurface formations for use in seismic exploration of water covered locations of the earth wherein seismic energy is generated by a seismic source, a portion of the seismic energy is detected by seismic detectors spaced along an elongated cable and comprising at least one seismic array, and the output signals from said seismic detectors are recorded for later seismic analysis, the improvement comprising:
summing the output signals of pluralities of said seismic detectors so as to form composite signals representative of the seismic energy detected along differing segmental lengths of said array;
recording simultaneously the composite signals representative of the seismic energy detected along said differing segmental lengths of said array; and
selecting an array segmental length for seismic analysis that enhances seismic data signal-to-noise ratio and minimizes distortion.

4. The method of claim 3 wherein the array segmental length selected for seismic analysis is the maximum length recorded over which the highest seismic signal frequency of interest has a phase correlation within one half cycle.

5. The method of claim 4 wherein the array segmental length is determined from the formula:

$$L = \frac{1.1\, bv}{2 \sin \phi}, \text{ and}$$

$$\phi = \alpha + \frac{\arctan \frac{x}{d} \cos \alpha}{2 + \frac{x}{d} \sin \alpha}$$

where:
$L$ = array segmental length, ft.
$v$ = average velocity of the seismic wave, ft. sec.$^{-1}$
$b$ = cycle breadth of maximum seismic frequency of interest, sec.
$\phi$ = average emergence angle of the seismic wave
$\alpha$ = dip angle of the reflecting horizon
$x$ = distance from seismic source to center of the array, ft.
$d$ = depth from which the seismic signal is reflected, ft.

6. The method of claim 5 wherein said maximum segmental length is determined for a plurality of vertical segments of subsurface formations and "$d$" is the depth of the top of a given vertical formation segment, and "$\alpha$" is assumed to be zero degrees, further including:
redetermining said maximum array segmental lengths if seismic analysis discloses subsurface horizons having dip angles other than zero degrees.

7. In a method for delineating subsurface formations for use in seismic exploration of water-covered locations of the earth wherein seismic energy is generated by a seismic source, a portion of the seismic energy is detected by seismic detectors spaced along an elongated cable, and comprising at least one seismic array, and the output signals from said seismic detectors are recorded for later seismic analysis, the improvement comprising:
dividing said array into a plurality of detector groups having parallel connected outputs, comprised of a central detector group and a plurality of groups located to either side of said central group;
connecting the output of each detector group located to one side of said central group in parallel with the output of the detector group similarly located to the other side of said central detector group;
summing selected numbers of the outputs of said detector groups located adjacent the central group with the output of said central group so as to form a plurality of composite seismic signals representative of the seismic energy detected along selected segmented lengths of said array prior to the recording of seismic data;
recording simultaneously the plurality of composite seismic signals so formed; and
selecting an array segmented length for seismic analysis that enhances signal-to-noise ratio of said seismic signal and minimizes distortion.

8. The method of claim 7 wherein the array segmental length selected for seismic analysis is the maximum length recorded over which the highest seismic signal frequency of interest has a phase correlation within one half cycle.

9. The method of claim 8 wherein the array segmental length is determined from the formula:

$$L = \frac{1.1\, bv}{2 \sin \phi}$$

and $$\phi = \alpha + \frac{\arctan \frac{x}{d} \cos \alpha}{2 + \frac{x}{d} \sin \alpha}$$

where:
$L$ = array segmental length, ft.
$v$ = average velocity of the seismic wave, ft. sec.$^{-1}$
$b$ = cycle breadth of the maximum seismic frequency of interest, sec.
$\phi$ = average emergence angle of the seismic wave
$\alpha$ = dip angle of the reflecting horizon
$x$ = distance from the seismic source to center of the array, ft.
$d$ = depth from which the seismic signal is reflected, ft.

10. The method of claim 9 wherein said maximum array segmental length is determined for a plurality of vertical segments of subsurface formations and "$d$" is the depth of the top of a given vertical formation segment, and "$\alpha$" is assumed to be zero degrees, further including:
redetermining said maximum array segmental lengths if seismic analysis discloses subsurface horizons having dip angles other than zero degrees.

11. In a method of delineating subsurface formations for use in seismic exploration of water-covered locations of the earth wherein seismic energy is generated by a seismic source, a portion of the seismic energy is detected by seismic detectors spaced along an elongated cable and comprising at least one seismic array, and the output signals from said seismic detectors are recorded for later seismic analysis, the improvement comprising:
dividing said array into a plurality of detector groups, said array comprised of a central detector group and a plurality of groups located to either side of said central group;
interconnecting the detectors within each group to produce a composite seismic signal representative of the seismic energy detected by the detectors comprising each group; and
recording simultaneously the composite seismic signal from the central detector group on a first recording channel and a seismic signal comprising a summation of the composite seismic signals from the two detector groups located to either side and adjacent said central group on a second recording channel.

12. The method of claim 11 wherein said array is divided into a central detector group and at least two detector groups on one side of said central detector group and at least two detector groups on the other side of said central detector group, further comprising:
recording on a third recording channel a seismic signal comprising a summation of the composite seismic signals from the two detector groups located to either side of the two detector groups adjacent said central detector group simultaneously with the recording of the signals on the first and second channels.

13. The method of claim 11 wherein the summation signal recorded on said second recording channel further comprises the composite seismic signal from the central detector group.

14. The method of claim 12 wherein the summation signal recorded on said second recording channel further comprises the composite seismic signal from the central detector group and the summation signal recorded on said third recording channel further comprises the composite seismic signal from the central detector group and the two detector groups located to either side and adjacent said central group.

15. Apparatus for conducting seismic exploration of water-covered areas of the earth's surface comprising:
an elongated cable having a multiplicity of seismic detectors at spaced apart locations along said cable formed into at least one array and said detectors forming said array are divided into a plurality of detector groups, the seismic detectors within each group being electrically interconnected to produce a composite seismic signal representative of the seismic energy detected by the seismic detectors comprising the group; and
means for generating simultaneously for recording by a seismic recorder, a first seismic signal representative of the seismic energy detected by a first detector group and a second seismic signal representative of the seismic energy detected by said first detector group and selected numbers of additional detector groups.

16. The apparatus of claim 15 wherein said selected numbers of additional detector groups comprise two detector groups positioned adjacently on each side of said first group.

* * * * *